United States Patent [19]

Hirata et al.

[11] Patent Number: 5,719,470

[45] Date of Patent: Feb. 17, 1998

[54] GYROTRON CAPABLE OF OUTPUTTING A PLURALITY OF WAVE BEAMS OF ELECTROMAGNETIC WAVES

[75] Inventors: Yosuke Hirata; Mitsuo Komuro; Yoshika Mitsunaka, all of Yokohama, Japan

[73] Assignee: Kabushiki Kaisha Toshiba, Kawasaki, Japan

[21] Appl. No.: 458,483

[22] Filed: Jun. 2, 1995

[30] Foreign Application Priority Data

Jun. 17, 1994 [JP] Japan ................. 6-135402

[51] Int. Cl.$^6$ ................. H01J 25/06; H01P 1/16
[52] U.S. Cl. ................. 315/5; 331/79; 333/21 R
[58] Field of Search ................. 333/21 R; 315/4, 315/5; 331/79

[56] References Cited

U.S. PATENT DOCUMENTS

| 5,134,342 | 7/1992 | Jödicke et al. ................. 315/5 |
| 5,187,409 | 2/1993 | Ito ................. 315/5 |

FOREIGN PATENT DOCUMENTS

| 117201 | 5/1990 | Japan ................. 333/21 R |

OTHER PUBLICATIONS

Int. J. Electronics, 1992, vol. 72, Nos. 5 and 6, 1079-1091, "110 GHz gyrotran with a built-in high-efficiency converter" by G.G. Denisov et al.

Toshiba Technical Report, No. 92-5486; Hirata; Aug. 5, 1992; pp. 79-86.

Primary Examiner—Benny T. Lee
Attorney, Agent, or Firm—Oblon, Spivak, McClelland, Maier & Neustadt, P.C.

[57] ABSTRACT

An electron beam generated by an electron gun is oscillated in a cavity resonator and output as a millimeter electromagnetic wave. The output electromagnetic wave is transmitted to a cylindrical mode converter. The inner wall surface of this mode converter has a plurality of sets of ridges and grooves spirally formed at equal pitches so as to gradually change the degree of corrugation in the transmission direction of the electromagnetic wave. The mode converter separates the input electromagnetic wave from the cavity resonator into a plurality of electromagnetic waves having the same power distribution. The output electromagnetic waves from the mode converter are transformed into wave beams by mirror systems and output to the outside of a gyrotron from output windows provided in a one-to-one correspondence with these electromagnetic waves.

13 Claims, 5 Drawing Sheets

GYROTRON CAPABLE OF OUTPUTTING A PLURALITY OF WAVE BEAMS OF ELECTROMAGNETIC WAVES

BACKGROUND OF THE INVENTION

1. Field of the Invention

The present invention relates to a gyrotron used in heating a plasma in a nuclear fusion reactor and, more particularly, to a gyrotron capable of outputting a plurality of wave beams of electromagnetic waves from a mode converter.

2. Description of the Related Art

The general methods of heating a plasma in a nuclear fusion reactor are classified into three categories: a method using Joule heating; a method called NBI (Neutral Beam Injection) heating in which a high-energy neutral beam is guided into the core of a reactor to generate heat; and a radio-frequency (RF) heating method in which the oscillation and the wave motion of a plasma are excited by externally applying a radio frequency signal which is close to the natural frequencies of the plasma. In particular, the use of electromagnetic waves in the millimeter-wave band has been studied in recent years in order to heat a plasma in a nuclear fusion reactor in accordance with the RF heating method.

Accordingly, a higher-mode gyrotron is currently considered to be promising as a high-power RF oscillation source for electromagnetic waves in the millimeter-wave band. Unfortunately, this gyrotron has the problem that a higher-mode electromagnetic wave oscillated by the electron beam in the cavity resonator has a large transmission loss in a waveguide. This is inconvenient in a gyrotron which requires high-power transmission over a distance of a few tens of meters from an oscillation source to a nuclear fusion reactor. Therefore, a method is being studied in which a higher-mode millimeter wave is transformed by a mode converter into a wave beam capable of propagation in free space and is transmitted through a quasi-optical transmission system and is radiated into the plasma.

This prior art will be described below with reference to the accompanying drawings.

FIG. 1 shows a schematic arrangement of a conventional gyrotron. The interior of a tube main body 1 of this gyrotron is held in a vacuum state. An electron gun 2 is mounted on one end of the tube main body 1, and a collector 4 is mounted on the other end at a position at which the collector 4 opposes the electron gun 2. This collector 4 captures an electron beam 3 emitted from the electron gun 2. Between the electron gun 2 and the collector 4, a beam tunnel 5, a cavity resonator 6, a waveguide 7, and a mode converter 8 are arranged in the order named from the electron gun 2.

In the path of an electromagnetic wave 9 emitted from the mode converter 8, a mirror system 15 consisting of reflecting mirrors 10, 11, 12, 13, and 14 and an output window 16 made of a dielectric substance such as sapphire glass or ceramics are arranged. This output window 16 radiates the electromagnetic wave 9, which is reflected by the reflecting mirror 14, from the inside of the tube main body 1 to the outside.

The electron gun 2 is constituted by a cathode 17 protruding toward the inside of the tube main body 1, a cylindrical anode 18 arranged around the cathode 17, and a gun coil 20 of a superconducting magnet 19 for applying a magnetic field to the cathode 17 and the anode 18. A high-voltage power supply 21 is connected between the cathode 17 and the anode 18, and a high-voltage power supply 22 is connected between the anode 18, the beam tunnel 5, and the collector 4. A main coil 23 of the superconducting magnet 19 is disposed at a position around the tube main body 1 at which the coil 23 surrounds the cavity resonator 6. Note that reference numeral 24 denotes a heater power supply for heating the cathode 17.

In this gyrotron with the above arrangement, the electron beam 3 generated by the electron gun 2 is guided into the cavity resonator 6 where the electromagnetic wave 9 in the millimeter-wave band is oscillated. The electromagnetic wave 9 is transformed into a wave beam (a Gaussian-like beam) as it passes through the mode converter 8 and through the mirror system 15 consisting of the reflecting mirrors 10, 11, 12, 13, and 14, and is externally outputted through the output window 16. In this case the power distribution of the electromagnetic wave 9 oscillated in the cavity resonator 6 is as shown in FIG. 2A in, e.g., a $TE_{22,6}$ mode. It is ideal that this power distribution become the one shown in FIG. 2B at the output window 16.

In a gyrotron of the above type, the output of a wave beam of an electromagnetic wave is increased in order to heat a plasma with a high efficiency. That is, a gyrotron is so designed as to be able to output a wave beam of an electromagnetic wave with a higher frequency (magnetic field) and a higher power. As an example, a recent target value of the output required of one gyrotron is 1 MW at 170 GHz.

It is unfortunate that in the gyrotron described above the heat generation at the output window 16 increases with increasing output. As mentioned earlier, the output window 16 is constructed from a dielectric substance such as sapphire glass or ceramics. Consequently, heat generation due to dielectric loss takes place when the electromagnetic wave 9 passes through the output window 16. Generally, the upper limit value of the output of an output window made of sapphire glass is said to be 500 kW at 170 GHz. Therefore, as the output of the gyrotron increases, output window destruction may occur due to the heat generation resulting from dielectric loss.

SUMMARY OF THE INVENTION

It is an object of the present invention to provide a gyrotron which can output a plurality of wave beams of electromagnetic waves and can prevent destruction of an output window when the output is increased.

It is a further object of the present invention to provide a gyrotron which can output a plurality of wave beams of electromagnetic waves and which is easy to process or design.

According to the first aspect of the present invention, there is provided a gyrotron comprising: an electron gun for generating an electron beam; a cavity resonator for oscillating the output electron beam from the electron gun to output an electromagnetic wave; a cylindrical mode converter for converting a mode of the output electromagnetic wave from the cavity resonator, the mode converter including an inner wall surface, on which a plurality of sets of ridges and grooves are spirally formed at equal pitches so as to gradually change a degree of corrugation in a transmission direction of the electromagnetic wave, and separating the electromagnetic wave into a plurality of electromagnetic waves; mirror means for individually transforming the output electromagnetic waves from the mode converter; and a plurality of output windows outputting the electromagnetic waves transformed by the mirror means to the outside of the gyrotron.

According to the second aspect of the present invention, there is provided a gyrotron comprising: generating means for generating an electromagnetic wave; separating means having a plurality of sets of ridges and grooves spirally formed at equal pitches so as to gradually change a degree of corrugation in a transmission direction of the electromagnetic wave, the separating means separating the electromagnetic wave generated by the generating means into a plurality of electromagnetic waves having the same power distribution while the generated electromagnetic wave is reflected by the plurality of sets of ridges and grooves; and output means for shaping the electromagnetic waves separated by the separating means into wave beams and outputting the wave beams to the outside of the gyrotron.

In each of the above gyrotrons, the inner wall surface of the mode converter is so formed that a difference in the height between the ridges and grooves gradually increases from an entrance toward a radiation opening for the electromagnetic wave.

In these gyrotrons as described above, the cylindrical mode converter (separating means) has an inner wall surface on which ridges and grooves are spirally formed at equal pitches so as to gradually change the degree of corrugation in the transmission direction of the electromagnetic wave. The mode converter separates the input electromagnetic wave into a plurality of electromagnetic waves having the same power distribution. The separated electromagnetic waves are transformed into wave beams by the mirror systems provided in a one-to-one correspondence with the electromagnetic waves and are output from the output windows to the outside of the gyrotron. Consequently, equal electromagnetic waves transformed into wave beams are radiated from the individual output windows. This makes it possible to increase the output of the apparatus while reducing the load on each output window.

Additionally, the present invention facilitates the processing of the mode converter for separating the electromagnetic wave and also facilitates the design of the mirror systems which transmit and transform the electromagnetic waves separated by the mode converter.

Additional objects and advantages of the invention will be set forth in the description which follows, and in part will be obvious from the description, or may be learned by practice of the invention. The objects and advantages of the invention may be realized and obtained by means of the combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention, in which:

FIGS. 2A and 2B are views each showing the power distribution of an electromagnetic wave, in which FIG. 2A shows the power distribution of an electromagnetic wave generated in a cavity resonator and FIG. 2B shows an ideal power distribution of an electromagnetic wave at an output window;

DETAILED DESCRIPTION OF THE PREFERRED EMBODIMENTS

The first and second embodiments of the present invention will be described below with reference to the accompanying drawings.

Figure 1:
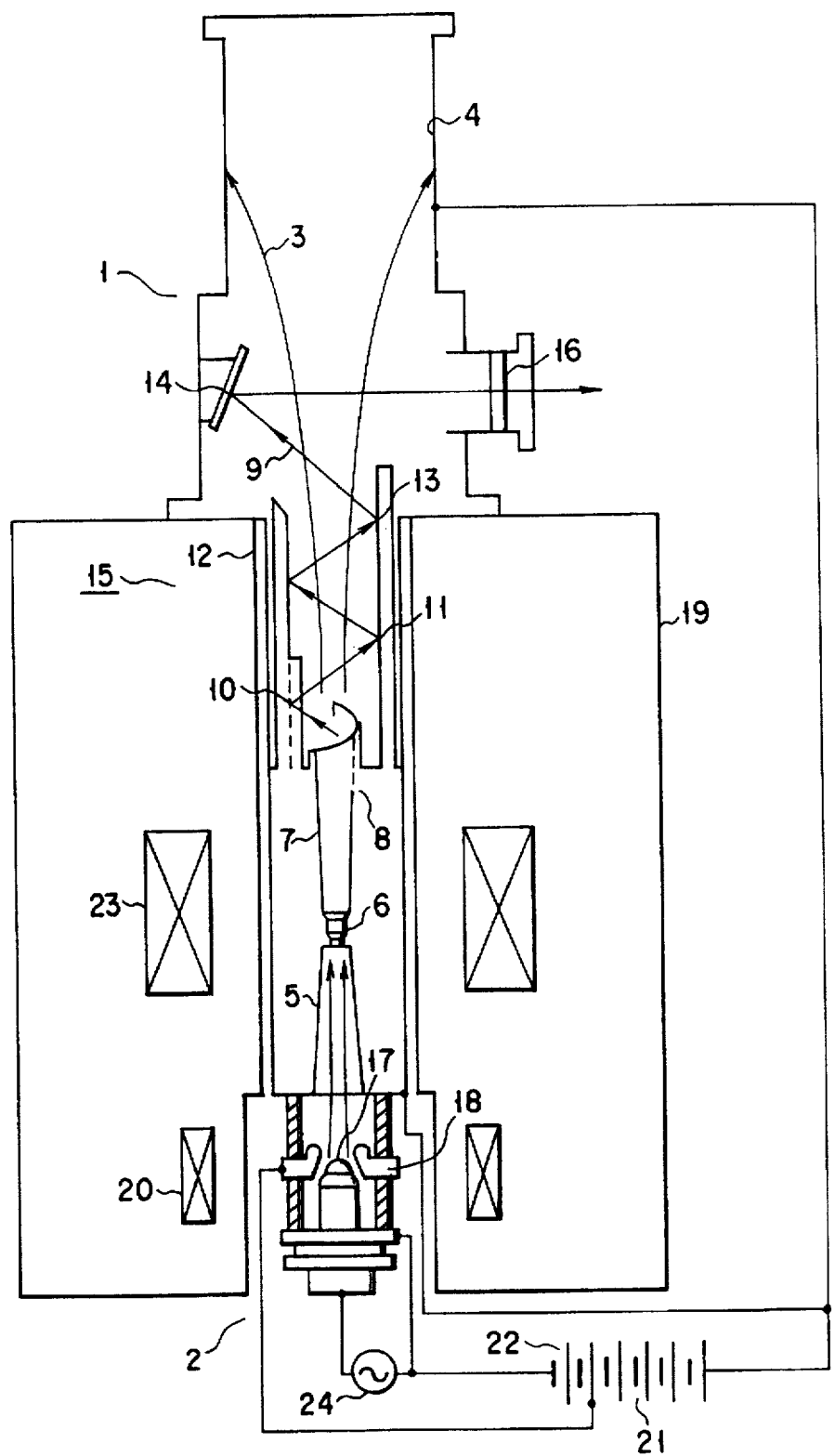
FIG. 1 is a view for explaining a schematic arrangement of a conventional gyrotron (prior art)
Figure 2A:
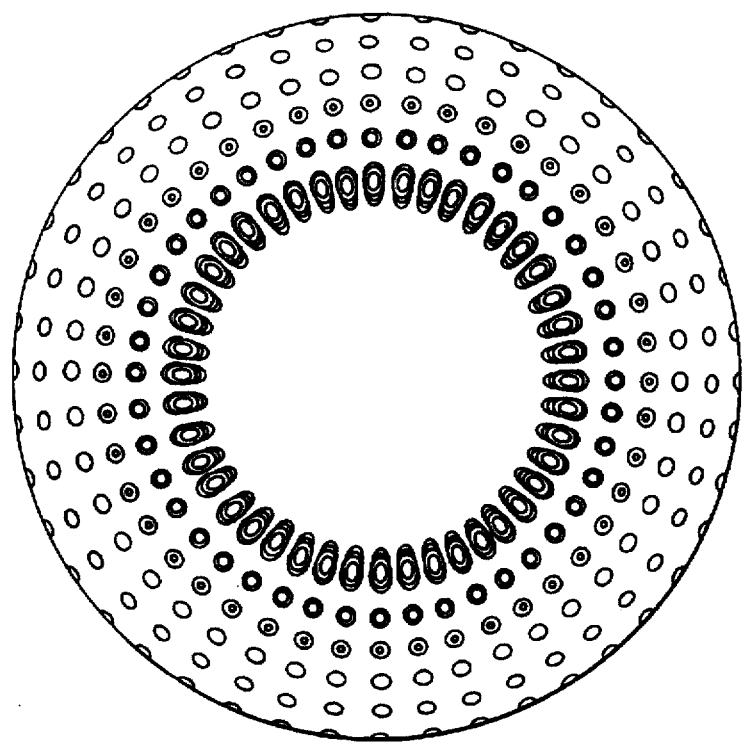
Figure 2B:
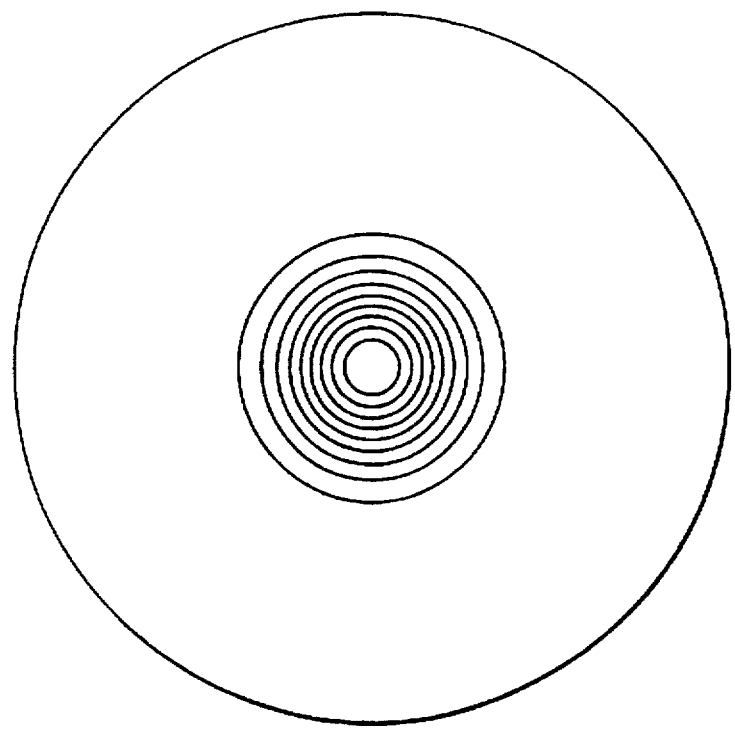
Figure 3:
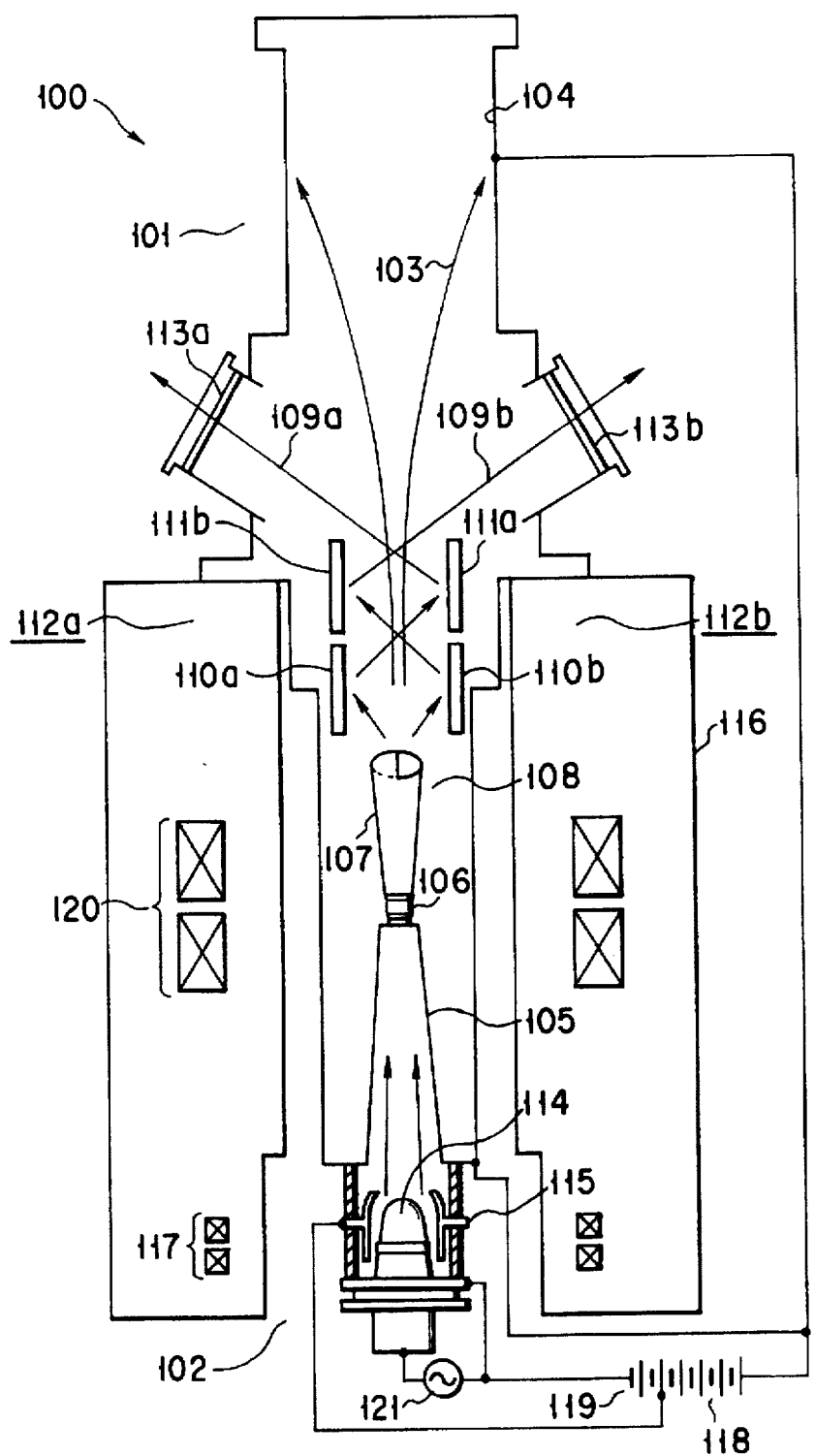
FIG. 3 is a view for explaining a schematic arrangement of a gyrotron according to the first embodiment of the present invention.
Figure 4:
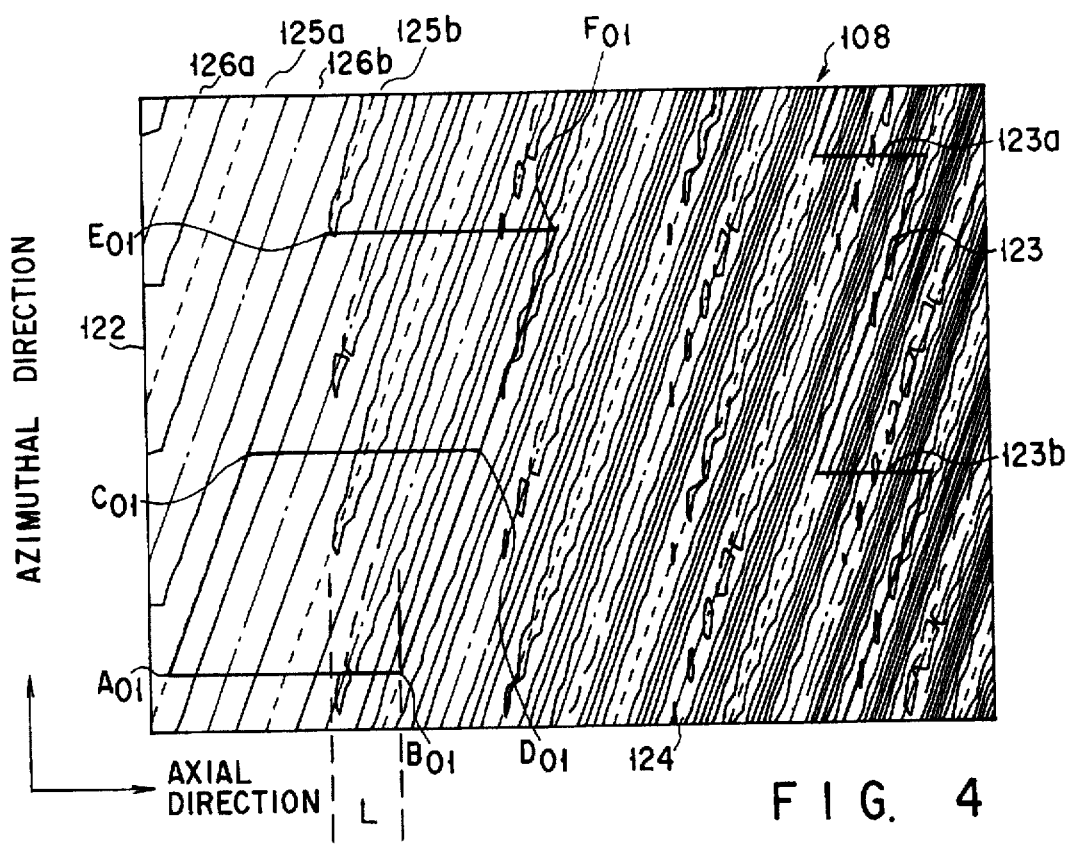
FIG. 4 is a view in which the inner wall surface of a mode converter in the first embodiment shown in FIG. 3 is developed in the azimuthal direction such that the lengths in the radial direction are represented by contour lines.
Figure 5:
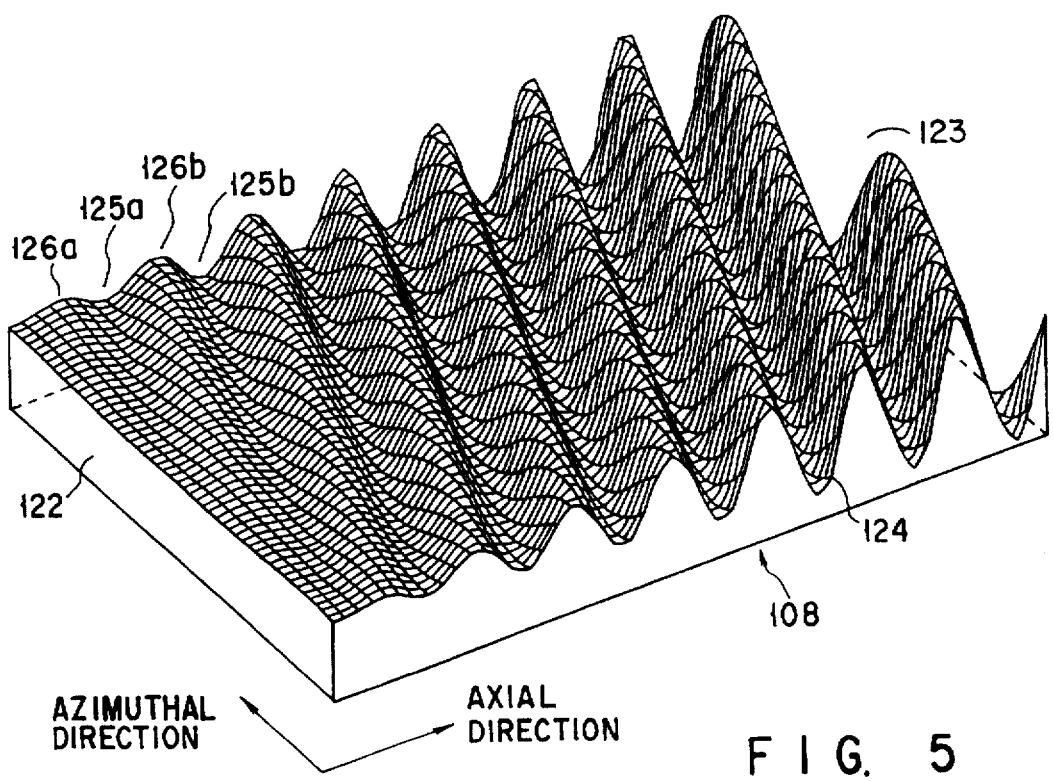
FIG. 5 is an enlarged perspective view for explaining the shapes of corrugation, with respect to the circumferential and axial directions, on the inner wall surface of the mode converter shown in FIGS. 2 and 3.

The first embodiment will be described below with reference to FIGS. 3 to 5. FIG. 3 shows a schematic arrangement of a gyrotron according to the first embodiment. FIG. 4 is a view in which the inner wall surface of a circular waveguide of a mode converter is developed in the azimuthal direction. FIG. 5 is a perspective view which is developed to explain corrugation on the inner surface of the circular waveguide. Note that in order to allow easy explanation, portions which do not actually exist also are illustrated in FIGS. 4 and 5.

A schematic arrangement of a gyrotron 100 will be described first with reference to FIG. 3. In the gyrotron 100, the interior of a tube main body 101 is held in a vacuum state. An electron gun 102 is mounted on one end of the tube main body 101, and a collector 104 is mounted on the other end at a position at which the collector 104 opposes the electron gun 102. This collector 104 captures an electron beam 103 emitted from the electron gun 102. Between the electron gun 102 and the collector 104, a beam tunnel 105, a cavity resonator 106, a waveguide 107, and a mode converter 108 are arranged in this order from the electron gun 102.

The mode converter 108 radiates two electromagnetic waves 109a and 109b in different directions with an angle of 180°. A mirror system 112a consisting of reflecting mirrors 110a and 111a is arranged in the path of the electromagnetic wave 109a, and a mirror system 112b consisting of reflecting mirrors 110b and 111b is arranged in the path of the electromagnetic wave 109b. Output windows 113a and 113b also are provided in these paths. The output windows 113a and 113b radiate the electromagnetic waves 109a and 109b, reflected by the reflecting mirrors 111a and 111b, respectively, from the inside of the tube main body 101 to the outside. These output windows 113a and 113b are made of a dielectric substance such as sapphire glass or ceramics.

The electron gun 102 is constituted by a cathode 114, an anode 115, and a gun coil 117 of a superconducting magnet 116. The cathode 114 protrudes toward the inside of the tube main body 101. The cylindrical anode 115 is so disposed as to surround the cathode 114. The gun coil 117 of the superconducting magnet 116 applies a magnetic field to the cathode 114 and the anode 115. A high-voltage power supply 118 is connected between the cathode 114 and the anode 115. A high-voltage power supply 119 is connected between the anode 115, the beam tunnel 105, and the collector 104. A main coil 120 of the superconducting magnet 116 is disposed at a position around the tube main body 101 at which the coil 120 surrounds the cavity resonator 106. Note that a heater power supply 121 heats the cathode 114.

The mode converter 108 will be described in detail below with reference to FIGS. 4 and 5. Throughout the Figures the term "axial direction" indicates a direction from an entrance (e.g., 122) toward a radiation opening (e.g., 123), which is perpendicular to a radial direction of the mode converter, and the term "azimuthal direction" indicates a direction along an interior wall of the mode converter and which is perpendicular to the "axial direction".

The mode converter 108 is a circular waveguide in which the inner sectional shape in the radial direction is so formed that the degree of corrugation gradually increases from an entrance 122 toward a radiation opening 123. The statement "the degree of corrugation gradually increases" means that the difference in the height between grooves and ridges gradually increases. Also, "gradually increases" does not necessarily mean "proportionally increases".

This mode converter 108 guides a higher-mode millimeter wave of an electromagnetic wave, which is oscillated by the electron beam in the cavity resonator 106 and incident into the entrance 122 from the waveguide 107, and converts the wave into a millimeter wave beam. The mode converter 108 also separates the millimeter wave into two waves and radiates the two waves. That is, on an inner wall surface 124 of the circular waveguide, two equal-pitch ridges 125a and 125b whose height gradually increases from the entrance 122 toward the radiation opening 123 and two equal-pitch grooves 126a and 126b whose depth gradually increases in the same direction are spirally formed. Note that in FIG. 4, the crest lines of the ridges 125a and 125b are indicated by the broken lines, and the trough lines of the grooves 126a and 126b are indicated by the alternate long and short dashed lines.

The shape of the inner wall surface 124 of the mode converter 108 as described above is expressed in the following manner.

That is, the spiral pitch, $L\alpha$, of the ridges 125a and 125b is substantially equal to pitch $L_1$ which is represented by $$L_1 = 2\pi R_0 \cdot \sin\theta_W / (\theta_W \cdot \tan\theta_B)$$

In this case it is assumed that $\cos\theta_W = m/\upsilon_{mn}$ and $\sin\theta_B = \upsilon_{mn}/\kappa R_0$ where $\kappa$ is the wave number, $R_0$ is the mean radius of the inner wall surface 124 of the mode converter 108, m and n are the mode numbers in the azimuthal direction and the radial direction, respectively, and $\upsilon_{mn}$ is the eigenvalue with respect to these mode numbers. Further, $\theta_W$ is defined as a half of the angle made when reflection points of rays constituting a mode, which continues as a line, are projected on a cross-section of a waveguide, and $\theta_B$ indicates an angle made between a traveling direction of the rays and an axial direction of the waveguide.

The deformation amount, $\delta$, from the mean radius $R_0$ of the inner wall surface 124 is represented by $$\delta(\phi, z) = f(z)[a + \cos l\{(2\pi/L\alpha)z + \phi\}]$$

where f(z) is an increasing function, a is a real number, l is an integer of 2 or larger, $\phi$ is the angle in the azimuthal direction of the mode converter 108, and z is an axis which is positive in the direction from the entrance 122 to the radiation opening 123 of the mode converter 108.

The pitch $L\alpha$ is almost equal to the pitch $L_1$ due to the following reason. The deformation amount $\delta$ is defined as follows:

$$\delta(\phi, z) = f(z)[a + \cos(z + \phi)]$$

where b=const.

In this case, the "spiral" for forming ridges or grooves is defined that "the deformation amount $\delta$ has maximal and minimal values in the z-axis direction". This definition is represented as follows:

$$\frac{\partial \delta}{\partial z} = \frac{df}{dz} a + \frac{df}{dz} \cos(bz + \phi) - bf(z) \sin(bz + \phi) = 0 \qquad (1)$$

If f(Z) is a constant (f(z)=c), then $$\frac{\partial \delta}{\partial z} = -bc \sin(bz + \phi) = 0$$

so that the deformation amount $\delta$ has the maximal and minimal values at a predetermined period ($2\pi/b$). If f(z), however, is not a constant, the maximal and minimal values of the deformation amount $\delta$ do not necessarily appear at the predetermined period due to the pressure of the z differential terms of equation (1), i.e., the first and second terms. A shift from the predetermined period depends on a rate of change in deformation amount in the axial direction and cannot be quantitatively determined. Note that a shift between the pitch $L\alpha$ and the pitch $L_1$ is limited within 1/10 the predetermined period ($2\pi/b$), if necessary.

The inner wall surface of the mode converter 108 is formed as described above. In a geometrical optical model, therefore, millimeter waves propagate as they are repetitively reflected along the spiral of the ridges 125a and 125b and the grooves 126a and 126b in the mode converter 108. In this case, as illustrated in FIG. 4, all the millimeter waves are reflected once inside a parallelogram $A_{01}B_{01}D_{01}C_{01}$ defined on the inner wall surface 124. Subsequently, the millimeter waves are reflected inside a parallelogram $C_{01}D_{01}F_{01}E_{01}$ adjacent to the first parallelogram in the direction of the spiral of the ridges 125a and 125b and the grooves 126a and 126b.

The distance, L, between a point obtained by projecting the coordinates of the center of the parallelogram $C_{01}D_{01}F_{01}E_{01}$ onto the axis of the mode converter 108 and a point obtained by projecting the coordinates of the center of the parallelogram $A_{01}B_{01}D_{01}C_{01}$ onto the same axis is given by $$L = 2R_0 \{(2\pi R_0/\lambda \upsilon_{mn})^2 - 1\}^{1/2} \cdot \{1 - (m/\upsilon_{mn})^2\}^{1/2}$$

where $\lambda$ is the wavelength, $R_0$ is the inner radius of the mode converter 108, m and n are the mode numbers, and $\upsilon_{mn}$ is the eigenvalue with respect to these mode numbers. Two trough lines of the grooves 126a and 126b are present in the parallelogram $A_{01}B_{01}D_{01}C_{01}$ and the parallelogram $C_{01}D_{01}F_{01}E_{01}$.

As the millimeter waves propagate through the mode converter 108 while they are repetitively reflected, they are collected in the two grooves 126a and 126b and separated into two groups. The two collected millimeter waves, i.e., the two electromagnetic waves 109a and 109b, are radiated in directions at different azimuth angles from radiation ends 123a and 123b (see FIG. 4) of the radiation opening 123, which include a portion of the spiral forming the ridges 125a and 125b with a low power density in order to suppress any diffraction loss.

As in FIG. 4, the distances from the entrance 122 to the two radiation ends 123a and 123b of the mode converter 108 are made equal by arranging the radiation ends 123a and 123b at equal intervals in the azimuthal direction. Therefore, as shown in FIG. 3, the two electromagnetic waves 109a and 109b radiated have exactly the same power distribution. Consequently, the electromagnetic waves 109a and 109b are transformed into wave beams through the two sets of the reflecting mirrors 110a and 111a, and 110b and 111b, of the mirror systems 112a and 112b, respectively, that are arranged symmetrically about the axis in the tube main body 101. The two wave beams are then externally radiated through the two output windows 113a and 113b.

As a result, the two separate electromagnetic waves 109a and 109b pass through the two output windows 113a and 113b, respectively. Accordingly, the heat generation (due to dielectric loss) taking place during the passage is also reduced by one-half. This makes it possible to double the output of the overall apparatus without destroying the output windows 113a and 113b.

Also, the mirror systems 112a and 112b can be identically designed since the two sets of the reflecting mirrors 110a and 111a, and 110b and 111b, have a completely symmetrical arrangement. This simplifies the design of the apparatus.

Furthermore, in the mode converter 108 the degree of deformation of the corrugation on the inner wall surface 124 is gradually changed. This makes the mode converter 108 extremely easy to process.

Note that in this embodiment, the shape of the radiation ends 123a and 123b of the radiation opening 123 of the mode converter 108 is azimuthally symmetrical with a periodicity of 2, which is equal to the number of sets of the ridges 125a and 125b and the grooves 126a and 126b, thereby obtaining outputs equal in the power distribution. However, the present invention is not limited to the above embodiment. As an example, it is possible to form three or more sets of ridges and grooves, and make the shape of the radiation ends of the radiation opening azimuthally symmetrical with the same periodicity as the set number of these ridges and grooves, thereby separating millimeter waves into a predetermined number of portions which is three or larger. Furthermore, millimeter waves separated into a predetermined number of portions can be transformed into wave beams through mirror systems arranged at positions which are azimuthally symmetrical with the same periodicity as the set number, thereby externally radiating these wave beams from the respective corresponding output windows.

Figure 6:
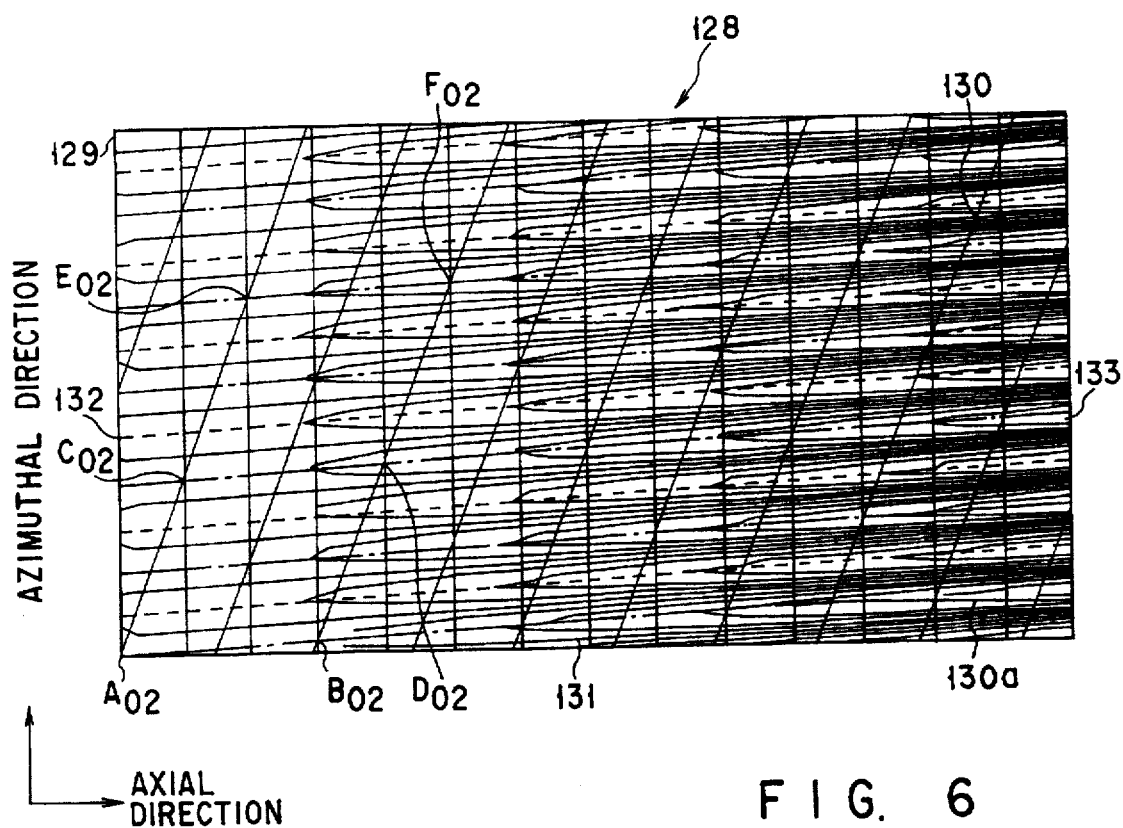
FIG. 6 is a view in which the inner wall surface of a mode converter in the second embodiment of the present invention is developed in the azimuthal direction such that the lengths in the radial direction are represented by contour lines.
Figure 7:
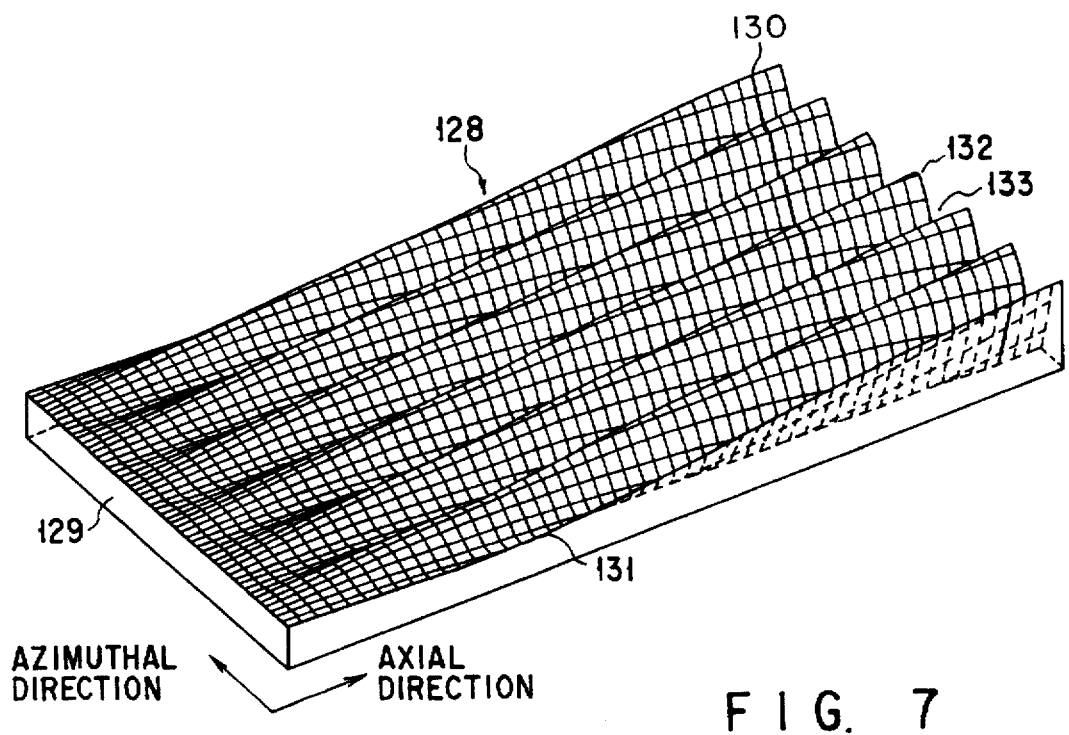
FIG. 7 is an enlarged perspective view for explaining the shapes of corrugation, with respect to the azimuthal and axial directions, on the inner wall surface of the mode converter shown in FIG. 6.

The second embodiment of a gyrotron according to the present invention will be described below with reference to FIGS. 6 and 7. This second embodiment differs from the first embodiment only in the arrangement of a mode converter. Therefore, only this mode converter will be described below, and the description of a schematic arrangement of the gyrotron will be omitted. FIG. 6 is a view in which the inner wall surface of a circular waveguide of the mode converter is developed in the azimuthal direction. FIG. 7 is a perspective view which is developed to explain corrugation on the inner surface of the circular waveguide. Note that as in FIGS. 4 and 5 described previously, portions which do not actually exist also are illustrated in FIGS. 6 and 7 in order to allow easy explanation.

A mode converter 128 is a circular waveguide in which the inner sectional shape in the radial direction is so formed that the degree of corrugation gradually increases from an entrance 129 toward a radiation opening 130. The statement "the degree of corrugation gradually increases" has the same definition as in the first embodiment.

As with the mode converter 108 in the first embodiment, the mode converter 128 guides a higher-mode millimeter wave of an electromagnetic wave, which is oscillated in a cavity resonator and incident into the entrance 129 from a waveguide, and converts the wave into a millimeter wave beam. The mode converter 128 also separates the millimeter wave into two waves and radiates the two waves. That is, on an inner wall surface 131 of the circular waveguide, a plurality of equal-pitch ridges 132 whose height gradually increases from the entrance 129 toward the radiation opening 130 and a plurality of equal-pitch grooves 133 whose depth gradually increases in the same direction are spirally formed in a direction substantially parallel to the axial direction. Note that in FIG. 6, the crest lines of the ridges 132 are indicated by the broken lines, and the trough lines of the grooves 133 are indicated by the alternate long and short dashed lines.

The shape of the inner wall surface 131 of the mode converter 128 as described above is expressed in the following way.

That is, the spiral pitch, $L\beta$, of the ridges 132 is substantially equal to pitch $L_2$ which is represented by $$L_2 = 2\pi L_0/(2\pi - 2n_2\theta_w)$$

In this case it is assumed that $$L_0 = 2R_0 \cdot \sin\theta_w/\tan\theta_B, \cos\theta_w = m/\upsilon_{mn} \text{ and } \sin\theta_B = \upsilon_{mn}/\kappa R_0$$

where $n_2$ is an integer, $\kappa$ is the wave number, $R_0$ is the mean radius of the inner wall surface 124 of the mode converter 108, m and n are the mode numbers in the azimuthal direction and the radial direction, respectively, and $\upsilon_{mn}$ is the eigenvalue with respect to these mode numbers.

The deformation amount, $\delta$, from the mean radius of the inner wall surface 131 of the mode converter 128 is represented by $$\delta(\phi, z) = f(z)[a - \cos l\{(2\pi/L\beta)z + \phi\}]$$

where f(z) is an increasing function, a is a real number, l is an integer of 2 or larger, $\phi$ is the angle in the azimuthal direction of the mode converter, and z is an axis which is positive in the direction from the entrance to the radiation opening of the mode converter.

The inner wall surface of the mode converter is formed as described above. In a geometrical optical model, therefore, millimeter waves propagate as they are repetitively reflected in a direction crossing the spiral of the ridges 132 and the grooves 133 in the mode converter 128. In this case, all the millimeter waves are reflected once inside a parallelogram $A_{02}B_{02}D_{02}C_{02}$ defined on the inner wall surface 131. Subsequently, the millimeter waves are reflected inside a parallelogram $C_{02}D_{02}F_{02}E_{02}$ adjacent to the first parallelogram in the direction crossing the spiral of the ridges 132 and the grooves 133. In this embodiment, inside the parallelograms $A_{02}B_{02}D_{02}C_{02}$ and $C_{02}D_{02}F_{02}E_{02}$ the ridges 132 and the grooves 133 are formed in a different direction from that in the first embodiment.

The millimeter waves are collected in the ridges 132 in propagating through the mode converter 128 while they are repetitively reflected. The millimeter waves thus collected are separated into two groups since two crest lines of the ridges 132 exist in the parallelograms $A_{02}B_{02}D_{02}C_{02}$ and $C_{02}D_{02}F_{02}E_{02}$. The two collected electromagnetic waves are separately radiated in directions at respective azimuth angles from a radiation end 130a (see FIG. 6) of the radiation opening 130 which includes, as a portion of the cut end, the grooves 133 with a low millimeter-wave power density.

These millimeter waves are transformed into wave beams through reflecting mirrors of mirror systems, in which two transmission paths are formed, arranged in a main tube body (not shown). The two wave beams are then externally radiated through two output windows.

As a result, an action and an effect similar to those in the first embodiment previously described can also be obtained in this second embodiment. Note that in each of the first and second embodiments, two sets of corrugation, i.e., ridges and grooves, are formed. However, it is also possible to form three or more sets of ridges and grooves. In this case millimeter-wave wave beams are separated into the same number of groups as the set number, and mirror systems and output windows are provided in accordance with the number of wave beams. Consequently, the load on each output window can be reduced. This makes it possible to increase the output of the apparatus while preventing destruction of the output windows.

As is apparent from the above description, the present invention facilitates the processing of the mode converter for separating an electromagnetic wave into a plurality of waves, and also facilitates the design of the mirror systems which transmit and transform the electromagnetic waves separated by the mode converter. In addition, the output of the apparatus can be increased since a plurality of wave beams of electromagnetic waves are obtained.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A gyrotron comprising:

an electron gun for generating an electron beam;

a cavity resonator for generating and outputting an electromagnetic wave using the electron beam generated by said electron gun;

a cylindrical mode converter for generating a plurality of electromagnetic waves using the electromagnetic wave output by said cavity resonator, said cylindrical mode converter including an inner wall surface, said inner wall surface having a plurality of sets of ridges and grooves which are spirally configured at equal pitches so as to gradually change a degree of corrugation in a transmission direction of the electromagnetic wave, whereby said set of ridges and grooves reflect and collect said electromagnetic wave such that said generated plurality of electromagnetic waves have a low power density to reduce heat loss on a plurality output windows;

mirror means for individually transforming the plurality of electromagnetic waves generated by said cylindrical mode converter into a plurality of wave beams; and said plurality of output windows outputting the plurality of wave beams transformed by said mode converter and said mirror means to the outside of said gyrotron.

2. A gyrotron according to claim 1, wherein said cylindrical mode converter includes an entrance for inputting the electromagnetic wave generated by said cavity resonator and a radiation opening for outputting the plurality of electromagnetic waves to said mirror means, and the inner wall surface of said mode converter is so configured such that a difference in height between said ridges and grooves gradually increase from the entrance toward the radiation opening for the electromagnetic waves.

3. A gyrotron according to claim 2, wherein radiation ends for outputting the electromagnetic waves at the radiation opening of said mode converter include a part of a spiral forming said ridges and grooves spirally formed on the inner wall surface of said mode converter.

4. A gyrotron comprising:

an electron gun for generating an electron beam;

a cavity resonator for generating and outputting an electromagnetic wave using the electron beam generated by said electron gun;

a cylindrical mode converter for generating a plurality of electromagnetic waves using the electromagnetic wave output by said cavity resonator, said cylindrical mode converter including an inner wall surface, said inner wall surface having a plurality of sets of ridges and grooves which are spirally configured at equal pitches so as to gradually change a degree of corrugation in a transmission direction of the electromagnetic wave;

mirror means for individually transforming the plurality of electromagnetic waves generated by said cylindrical mode converter into a plurality of wave beams; and a plurality of output windows outputting the plurality of wave beams transformed by said mode converter and said mirror means to the outside of said gyrotron;

wherein said cylindrical mode converter includes an entrance for inputting the electromagnetic wave generated by said cavity resonator and a radiation opening for outputting the plurality of electromagnetic waves to said mirror means, and the inner wall surface of said mode converter is so configured such that a difference in height between said ridges and grooves gradually increases from the entrance toward the radiation opening for the electromagnetic waves; and wherein a spiral pitch $L\beta$ of said ridges of said mode converter is substantially equal to a pitch $L_2$ which is represented by $$L_2 = 2\pi L_O/(2\pi - 2n_2\theta_W)$$

assuming that $L_O = 2R_O \cdot \sin\theta_W/\tan\theta_B$, $\cos\theta_W = m/\upsilon_{mn}$, and $\sin\theta_B = \upsilon_{mn}/\kappa R_O$ where $n_2$ is an integer, $\kappa$ is the wave number, $R_O$ is the mean radius of the inner wall surface of said mode converter, m and n are the mode numbers in an azimuthal direction and a radial direction, respectively, $\upsilon_{mn}$ is the eigenvalue with respect to the mode numbers, $\theta_W$ defined as a half an angle made when reflection points of rays constituting a mode, which continues as a line, are projected on a cross-section of a waveguide, and $\theta_B$ indicates an angle made between a traveling direction of the rays and an axial direction of the waveguide.

5. A gyrotron according to claim 4, wherein a deformation amount $\delta$ from the mean radius of the inner wall surface of said mode converter is represented by $$\delta(\phi, z) = f(z)[a + \cos l\{(2\pi/L\beta)z + \phi\}]$$

where f(z) is an increasing function, a is a real number, l is an integer of not less than 2, $\phi$ is the angle in the azimuthal direction of said mode converter, and z is an axis which is positive in the direction from the entrance to the radiation opening of said mode converter.

6. A gyrotron comprising:

an electron gun for generating an electron beam;

a cavity resonator for generating and outputting an electromagnetic wave using the electron beam generated by said electron gun;

a cylindrical mode converter for generating a plurality of electromagnetic waves using the electromagnetic wave output by said cavity resonator, said cylindrical mode converter including an inner wall surface, said inner wall surface having a plurality of sets of ridges and grooves which are spirally configured at equal pitches so as to gradually change a degree of corrugation in a transmission direction of the electromagnetic wave;

mirror means for individually transforming the plurality of electromagnetic waves generated by said cylindrical mode converter into a plurality of wave beams; and a plurality of output windows outputting the plurality of wave beams transformed by said mode converter and said mirror means to the outside of said gyrotron;

wherein said cylindrical mode converter includes an entrance for inputting the electromagnetic wave generated by said cavity resonator and a radiation opening for outputting the plurality of electromagnetic waves to said mirror means, and the inner wall surface of said mode converter is so configured such that a difference in height between said ridges and grooves gradually increases from the entrance toward the radiation opening for the electromagnetic waves; and wherein a spiral pitch $L\alpha$ of said ridges of said mode converter is substantially equal to a pitch $L_1$ which is represented by $$L_1 = 2\pi R_O \cdot \sin\theta_W / (\theta_W \cdot \tan\theta_B)$$

assuming that $\cos\theta_W = m/\upsilon_{mn}$ and $\sin\theta_B = \upsilon_{mn}/\kappa R_O$ where $\kappa$ is the wave number, $R_O$ is the mean radius of the inner wall surface of said mode converter, m and n are the mode numbers in an azimuthal direction and a radial direction, respectively, $\upsilon_{mn}$ is the eigenvalue with respect to the mode numbers, $\theta_W$ is defined as a half an angle made when reflection points of rays constituting a mode, which continues as a line, are projected on a cross-section of a waveguide, and $\theta_B$ indicates an angle made between a traveling direction of the rays and an axial direction of the waveguide.

7. A gyrotron according to claim 6, wherein a deformation amount $\delta$ from the mean radius of the inner wall surface of said mode converter is represented by $$\delta(\phi, z) = f(z)\{a + \cos l\{(2\pi/L\alpha)z + \phi\}\}$$

where f(z) is an increasing function, a is a real number, l is an integer of not less than 2, $\phi$ is the angle in the azimuthal direction of said mode converter, and z is an axis which is positive in the direction from the entrance to the radiation opening of said mode converter.

8. A gyrotron according to claim 6, wherein radiation ends for outputting the electromagnetic waves at the radiation opening of said mode converter are azimuthally symmetrical with a periodicity equal to the number of sets of said ridges and grooves on the inner wall surface of said mode converter.

9. A gyrotron according to claim 6, wherein said mirror means includes a plurality of mirrors arranged at positions azimuthally symmetrical with a periodicity equal in number to the number of the separated electromagnetic waves.

10. A gyrotron comprising:

first generating means for generating an electromagnetic wave;

second generating means, connected to said first generating means, having a plurality of sets of ridges and grooves spirally configured at equal pitches so as to gradually change a degree of corrugation in a transmission direction of the electromagnetic wave, for generating a plurality of electromagnetic waves while the electromagnetic wave generated by said first generating means is reflected by said plurality of sets of ridges and grooves, whereby said generated plurality of electromagnetic waves have a low power density to reduce heat loss on a plurality of output windows; and output means for transforming the plurality of electromagnetic waves generated by said second generating means into a plurality of wave beams and outputting the plurality of wave beams to the outside of said gyrotron via said plurality of output windows.

11. A gyrotron according to claim 10, wherein said second generating means includes an entrance for inputting the electromagnetic wave generated by said first generating means and a radiation opening for outputting the plurality of electromagnetic waves to said output means, and said plurality of sets of ridges and grooves of said separating means are so configured so as to gradually increase a difference in height between said ridges and grooves from the entrance toward the radiation opening for the electromagnetic waves.

12. A gyrotron according to claim 10, wherein said plurality of sets of ridges and grooves of said separating means are so configured such that the generated electromagnetic waves are repetitively reflected and collected in said grooves.

13. A gyrotron according to claim 10, wherein said plurality of sets of ridges and grooves of said separating means are so configured such that the generated electromagnetic waves are repetitively reflected and collected in said ridges.

* * * * *